(12) United States Patent
Buckingham

(10) Patent No.: US 7,918,001 B2
(45) Date of Patent: Apr. 5, 2011

(54) MULTI-PIVOT LATCH ASSEMBLIES

(75) Inventor: Fred Buckingham, Elkhart, IN (US)

(73) Assignee: AmSafe Commercial Products, Inc., Elkhart, IN (US)

( * ) Notice: Subject to any disclaimer, the term of this patent is extended or adjusted under 35 U.S.C. 154(b) by 580 days.

(21) Appl. No.: 12/060,095

(22) Filed: Mar. 31, 2008

(65) Prior Publication Data
US 2009/0241305 A1 Oct. 1, 2009

(51) Int. Cl.
F16B 45/02 (2006.01)
(52) U.S. Cl. ................... 24/599.1; 24/599.3
(58) Field of Classification Search ............ 24/599.1, 24/599.3, 598.7, 598.4, 598.1; 297/485, 297/250.1, 253; 292/215
See application file for complete search history.

(56) References Cited

U.S. PATENT DOCUMENTS

| 805,674 | A | 11/1905 | Senderling |
| 820,383 | A | 5/1906 | Ashland |
| 867,162 | A | 9/1907 | Seidl |
| 940,917 | A | 11/1909 | Asquith |
| 1,171,380 | A | 2/1916 | Arthur |
| 1,299,821 | A | 4/1919 | Carpmill et al. |
| 1,397,237 | A | 11/1921 | Schenk |
| 2,124,276 | A | 7/1938 | Steigenberger |
| 2,393,551 | A | 1/1946 | Morin |
| 2,398,947 | A | 4/1946 | Marinsky |
| 2,549,841 | A | 4/1951 | Morrow et al. |
| 2,763,451 | A | 9/1956 | Moran |
| 2,856,663 | A | 10/1958 | Elsner |
| 2,938,254 | A | 5/1960 | Gaylord |
| 3,013,517 | A | 12/1961 | Isham |
| 3,128,520 | A | 4/1964 | Carter et al. |
| 3,414,947 | A | 12/1968 | Holmberg et al. |
| 3,540,091 | A | 11/1970 | Marosy |
| 3,675,499 | A | 7/1972 | Marosy |
| 4,027,361 | A | 6/1977 | Yoneya |
| 4,136,422 | A | 1/1979 | Ivanov et al. |
| 4,184,234 | A | 1/1980 | Anthony et al. |
| 4,419,874 | A | 12/1983 | Brentini |
| 4,487,588 | A | 12/1984 | Lewis, III et al. |
| 4,525,901 | A | 7/1985 | Krauss |
| 4,542,563 | A | 9/1985 | Befort |
| 4,606,577 | A | 8/1986 | Hirama et al. |

(Continued)

FOREIGN PATENT DOCUMENTS

CA 2450995 A1 2/2003

(Continued)

OTHER PUBLICATIONS

U.S. Appl. No. 12/775,268, filed May 6, 2010, Buckingham et al.

(Continued)

*Primary Examiner* — James R Brittain
(74) *Attorney, Agent, or Firm* — Perkins Coie LLP

(57) ABSTRACT

Multi pivot latch assemblies for releasably engaging anchors and other attach points in vehicles are disclosed herein. A latch assembly configured in accordance with one embodiment of the disclosure includes a latch and an actuator, each of which is movably coupled to a frame. In operation, movement of the actuator from a locked position toward an unlocked position causes the latch to rotate from a first position to a second position about a first pivot point, and from the second position toward the third position about a second pivot point to open the latch assembly and release the anchor.

20 Claims, 10 Drawing Sheets

U.S. PATENT DOCUMENTS

| | | | |
|---|---|---|---|
| 4,660,889 A | 4/1987 | Anthony et al. |
| 4,721,338 A | 1/1988 | Kondo |
| 4,876,770 A | 10/1989 | Bougher |
| 4,919,484 A | 4/1990 | Bougher et al. |
| 4,925,221 A | 5/1990 | Carmody et al. |
| 5,031,962 A | 7/1991 | Lee |
| 5,377,386 A | 1/1995 | Griffith |
| 5,430,914 A | 7/1995 | Patterson et al. |
| 5,466,044 A | 11/1995 | Barley et al. |
| 5,471,714 A | 12/1995 | Olson et al. |
| 5,487,588 A | 1/1996 | Burleigh et al. |
| 5,524,965 A | 6/1996 | Barley |
| 5,568,676 A | 10/1996 | Freeman |
| 5,669,663 A | 9/1997 | Feuerherdt |
| 5,695,243 A | 12/1997 | Anthony et al. |
| 5,774,947 A | 7/1998 | Anscher |
| 5,779,319 A | 7/1998 | Merrick |
| 5,816,651 A | 10/1998 | Feuerherdt |
| 5,890,762 A | 4/1999 | Yoshida |
| 5,915,630 A | 6/1999 | Step |
| 5,918,934 A | 7/1999 | Siegrist |
| 5,941,601 A | 8/1999 | Scott et al. |
| 5,979,982 A | 11/1999 | Nakagawa |
| 6,017,087 A | 1/2000 | Anthony et al. |
| 6,030,046 A | 2/2000 | Dorow |
| 6,082,819 A | 7/2000 | Jackson |
| 6,183,044 B1 | 2/2001 | Koyanagi et al. |
| 6,193,310 B1 | 2/2001 | Batalaris et al. |
| 6,209,957 B1 | 4/2001 | Baloga et al. |
| 6,234,572 B1 | 5/2001 | Shiino et al. |
| 6,276,754 B1 | 8/2001 | Youssef-Agha et al. |
| 6,400,145 B1 | 6/2002 | Chamings et al. |
| 6,419,199 B1 | 7/2002 | Skofljanec et al. |
| 6,425,632 B1 | 7/2002 | Anthony et al. |
| 6,494,535 B2 | 12/2002 | Galbreath |
| 6,510,593 B1 | 1/2003 | Kim |
| 6,566,869 B2 | 5/2003 | Chamings et al. |
| 6,669,288 B2 | 12/2003 | Nakagawa et al. |
| 6,796,610 B2 | 9/2004 | Nakagawa et al. |
| 6,820,310 B2 | 11/2004 | Woodard et al. |
| 6,948,219 B2 | 9/2005 | Kakuda et al. |
| 6,962,394 B2 | 11/2005 | Anthony et al. |
| 7,073,233 B2 | 7/2006 | Leva et al. |
| 7,152,926 B2 | 12/2006 | Wrobel |
| 7,152,928 B2 | 12/2006 | Yetukuri et al. |
| 7,246,854 B2 | 7/2007 | Dingman et al. |
| 7,278,684 B2 | 10/2007 | Boyle |
| D610,036 S | 2/2010 | Balensiefer, II |
| 7,810,220 B2 | 10/2010 | Anthony et al. |
| 7,862,124 B2 | 1/2011 | Dingman |
| 2003/0197415 A1 | 10/2003 | Dingman |
| 2004/0007909 A1 | 1/2004 | Bonk |
| 2004/0195900 A1 | 10/2004 | The et al. |
| 2004/0208692 A1 | 10/2004 | Anthony et al. |
| 2006/0186675 A1 | 8/2006 | Suzumura et al. |
| 2007/0067970 A1* | 3/2007 | Claus et al. ............... 24/599.9 |

FOREIGN PATENT DOCUMENTS

| | | |
|---|---|---|
| CA | 2522705 A1 | 11/2004 |
| DE | 19848231 A1 | 8/1999 |
| DE | 19946579 A1 | 4/2001 |
| EP | 0560184 A1 | 9/1993 |
| EP | 0566856 A1 | 10/1993 |
| EP | 0619201 A1 | 10/1994 |
| EP | 0619202 A1 | 10/1994 |
| EP | 0646491 A1 | 4/1995 |
| EP | 0703113 A2 | 3/1996 |
| EP | 0714806 A2 | 6/1996 |
| EP | 0841209 A1 | 5/1998 |
| EP | 0952032 A2 | 10/1999 |
| EP | 0970842 A1 | 1/2000 |
| EP | 982182 A1 | 3/2000 |
| EP | 1059194 A1 | 12/2000 |
| EP | 1099602 A1 | 5/2001 |
| EP | 1231100 A1 | 8/2002 |
| EP | 1414680 A1 | 5/2004 |
| EP | 1439977 A2 | 7/2004 |
| EP | 1472949 A1 | 11/2004 |
| EP | 1628525 A2 | 3/2006 |
| FR | 2782483 A1 | 2/2000 |
| GB | 2055952 | 3/1981 |
| GB | 2346083 A | 8/2000 |
| GB | 2349813 A | 11/2000 |
| GB | 2365916 A | 2/2002 |
| JP | 2002012069 A | 1/2002 |
| WO | WO-03010024 A2 | 2/2003 |
| WO | WO-03010035 A1 | 2/2003 |
| WO | WO-2004093533 A2 | 11/2004 |
| WO | WO-2009009789 A1 | 1/2009 |
| WO | WO-2010114571 A1 | 10/2010 |

OTHER PUBLICATIONS

U.S. Appl. No. 60/307,899, filed Jul. 26, 2001, Woodard.
U.S. Appl. No. 60/394,099, filed Jul. 5, 2002, Woodard.
"SafeGuard Buckle Up With Confidence," IMMI, 2002, 12 pages.
"Safeguard Child Protection, Seat Attachment Systems," Brochure, IMMI, 2001, 5 pages.
"SafeGuard Child Seat Attachment Systems," IMMI, 1999, 2 pages.
Holmberqs, ISOFIX—Connectors, 1 page.
Holmbergs, Isofix Connector C2, http://www.holmbergs.se/1/1.0.1.0/47/1/ [accessed May 21, 2010], 2 pages.
International Organization for Standardization (ISO), Draft Report of the 18th meeting of WG 1 held on 10 and 11 Nov. 1997 in Orlando, Florida, 11 pages.
Novarace, EU ISOFIX http://www.novarace.com/index.php?option=com_content&task=view&id=42&Itemid=62 [accessed May 21, 2010], 1 page.
Novarace, NOVAFIX, http://www.novarace.com/index.php?option=com_content&task=view&id=43&Itemid=51 [accessed May 21, 2010], 1 page.
Sabelt Racing Seatbelts and Accessories, http://childsafety.sabelt.com/index.php/eshop/category/Sabelt-Racing-Seatbelts-and-Accessories.html?a=/1/frmCatID/290/ [accessed May 21, 2010], 3 pages.
U.S. Appl. No. 12/415,906, filed Mar. 31, 2009, Buckingham.
International Search Report and Written Opinion for PCT/US2009/039019; Applicant: AmSafe Commercial Products, Inc.; Mailed on May 26, 2009, 12 pages.
International Search Report and Written Opinion for PCT/US2010/034933; Applicant: AmSafe Commercial Products, Inc.; Mailed on Jul. 16, 2010, 11 pages.
U.S. Appl. No. 12/485,778, filed Jun. 16, 2009, Buckingham.
International Search Report and Written Opinion for PCT/US2009/047559; Applicant: AmSafe Commercial Products, Inc.; Mailed on Aug. 7, 2009, 10 pages.

* cited by examiner

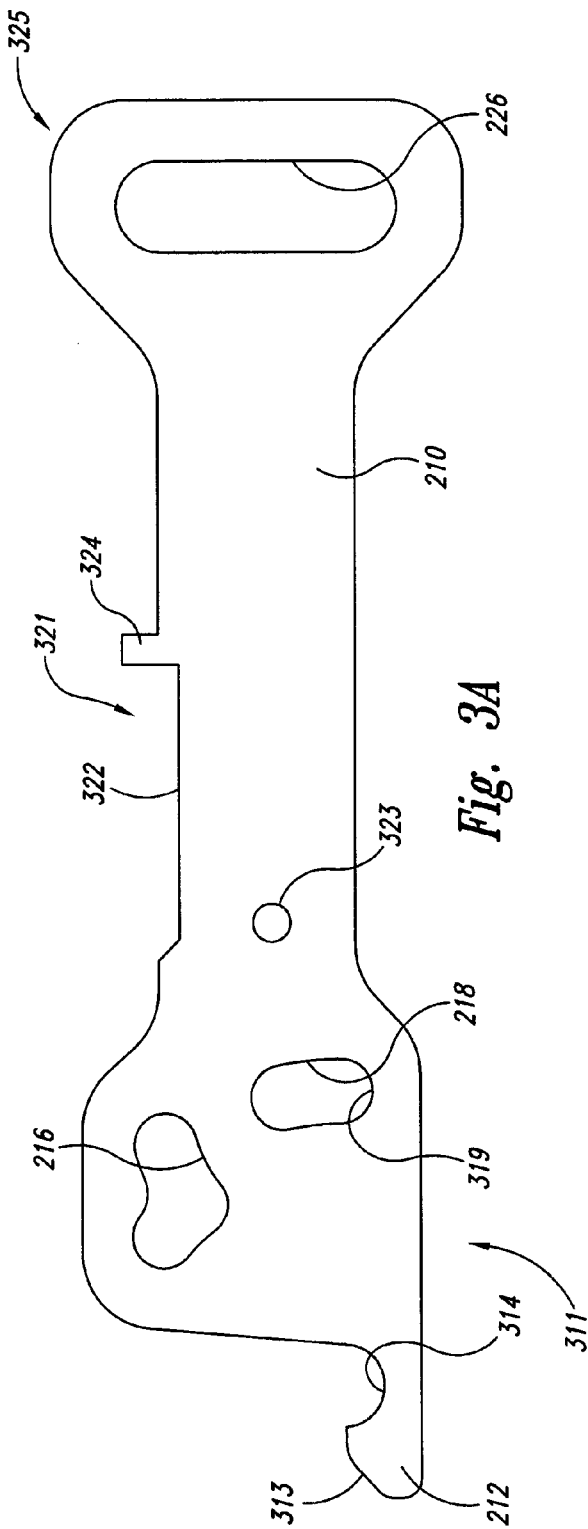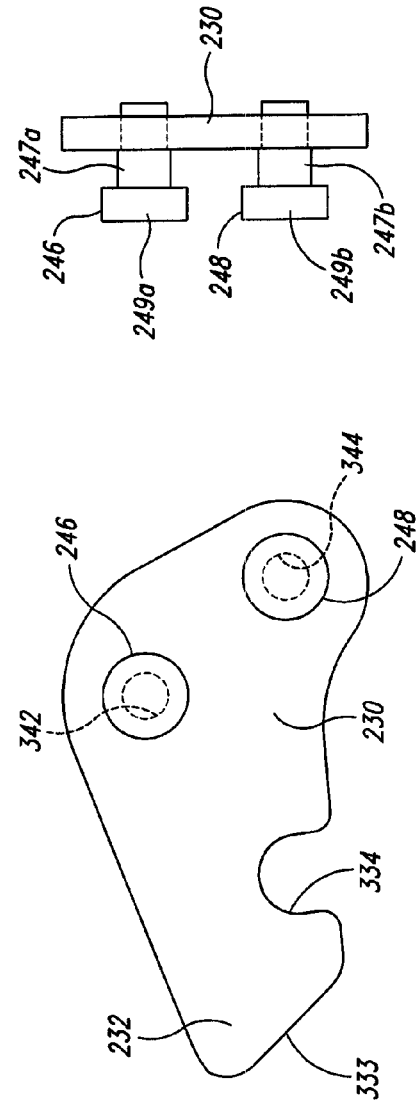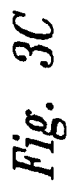

US 7,918,001 B2

MULTI-PIVOT LATCH ASSEMBLIES

TECHNICAL FIELD

The present disclosure relates generally to latch assemblies for releasably securing child seats and other restraint systems to anchors and other attach points in vehicles.

BACKGROUND

There are many types of personal restraint systems used in automobiles and other vehicles. One type of personal restraint system used for children is a portable child seat. Portable child seats are typically secured to seats in automobiles.

One method of securing the child seat includes attaching a web or belt from the child seat to a metal bar or an anchor in the vehicle with a releasable latch assembly. To accommodate different types of child seats, automobiles typically include several anchors at various locations. A lower anchor, for example, is typically positioned at the intersection between an upper seat back portion and a lower seat portion so that it does not interfere with a passenger sitting in the seat. The lower anchor is accessible, however, so that the latch assembly can be easily engaged with the anchor to secure the child seat in position.

SUMMARY

The following summary is provided for the benefit of the reader only, and is not intended to limit the disclosure as set forth by the claims in any way.

The present disclosure is directed generally to latch assemblies for releasably engaging anchors in vehicles. A latch assembly configured in accordance with one embodiment of the disclosure includes a latch and an actuator, each of which is movably coupled to a frame. In operation, movement of the actuator from a locked position toward an unlocked position causes the latch to rotate from a first position to a second position about a first pivot point, and from the second position to a third position about a second pivot point to open the latch assembly.

A latch assembly configured in accordance with another embodiment of the disclosure includes a latch movably coupled to a frame. The latch includes a jaw portion that receives and retains an anchor fixedly attached to a vehicle. The latch further includes first and second guide features, each of which is movably received in corresponding first and second openings in the frame. The latch assembly also includes an actuator that is movably coupled to the frame. Movement of the actuator from a locked position toward an intermediate position pivots the latch about the anchor. Continued movement of the actuator from the intermediate position toward an unlocked position pivots the latch about the second guide feature and releases the anchor from the jaw portion of the latch.

BRIEF DESCRIPTION OF THE DRAWINGS

FIGS. 3A and 3B are side views, FIG. 3C is a rear view.

DETAILED DESCRIPTION

The following disclosure describes various types of latch assemblies and systems, and methods of using such latch assemblies and systems. Certain details are set forth in the following description and in FIGS. 1-4C to provide a thorough understanding of various embodiments of the disclosure. Other details describing well-known structures and systems often associated with latch assemblies, child seats, and related vehicle structures, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
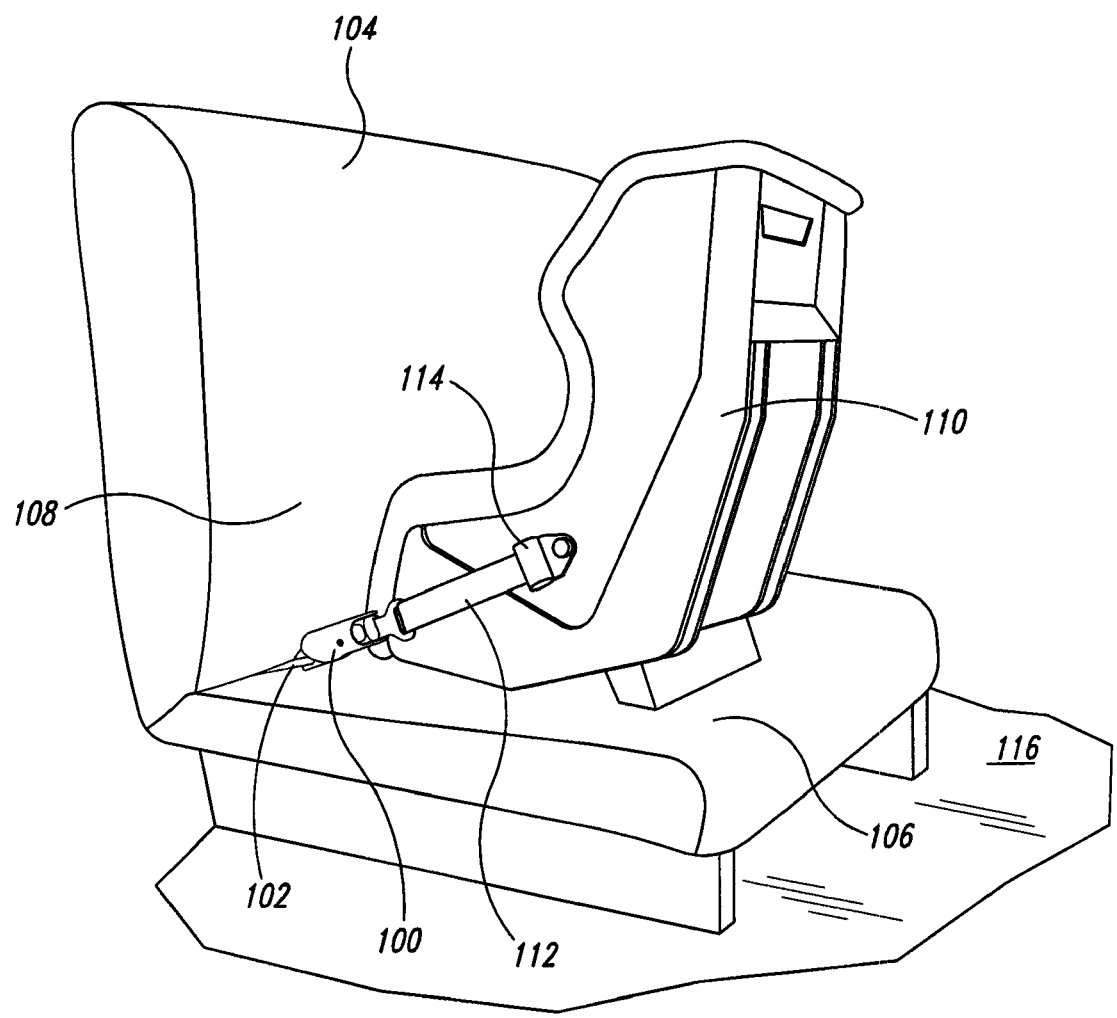
FIG. 1 is an isometric view of a child seat secured in a vehicle with a latch assembly configured in accordance with an embodiment of the disclosure.

FIG. 1 is an isometric view of a portable passenger restraint 110 (e.g., a child car seat) secured to a seat 104 in a vehicle 116 by a latch assembly 100 configured in accordance with an embodiment of the disclosure. The latch assembly 100 is coupled to the passenger restraint 110 by a web or belt 112 and an adjustable buckle 114. The latch assembly 100 is attached to the seat 104 by an anchor 102. In the illustrated embodiment, the anchor 102 is a metal bar or loop mounted between an upper seat portion 104 and a lower seat portion 106. In other embodiments, however, the latch assembly 100 can be attached to anchors or other structures positioned at other locations in the vehicle 116. For example, although a rear facing child car seat is shown in the embodiment illustrated in FIG. 1, the latch assemblies disclosed herein can also be used with other types of portable passenger restraints including, for example, forward facing child car seats. In the illustrated embodiment, only a single latch assembly 100 is shown. One skilled in the art will appreciate, however, that in other embodiments more than one latch assembly 100 may be used to secure the passenger restraint 110 to the seat 104 in accordance with the present disclosure. Moreover, one skilled in the art will appreciate that the latch assembly 100 can be used with various types of vehicles (e.g., automobiles, aircraft, rotorcraft, watercraft, etc.), and with other types of restraint systems (e.g., passenger, cargo, etc.).

Figure 2A:
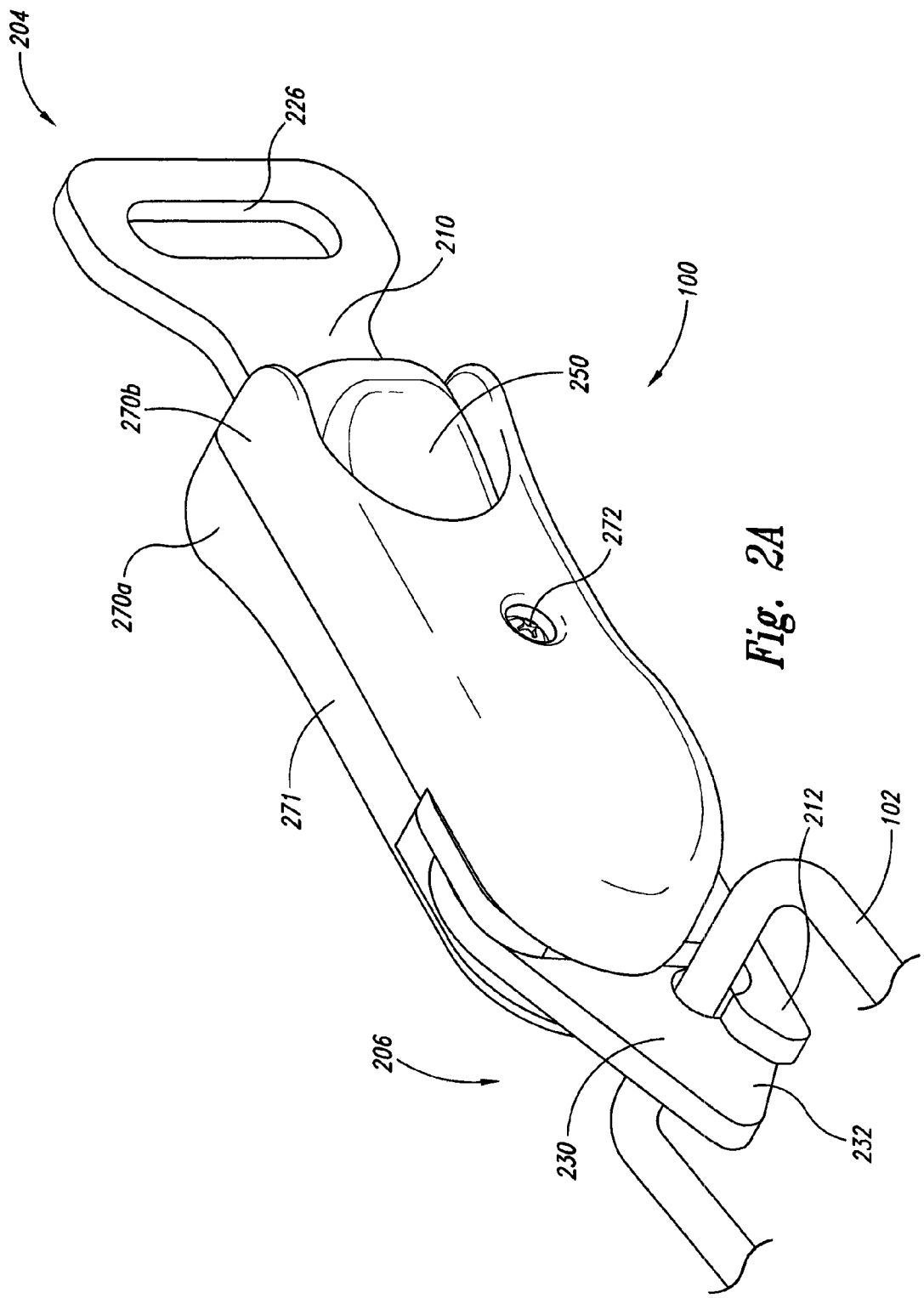
FIG. 2A is an isometric view of a latch assembly configured in accordance with an embodiment of the disclosure with the latch assembly in a closed position.

FIG. 2A is an enlarged isometric view of the latch assembly 100 of FIG. 1. In the illustrated embodiment, the latch assembly 100 is in a closed position engaged with the anchor 102. The latch assembly 100 includes a latch 230 and an actuator 250 movably coupled to a frame 210. The latch assembly 100 also includes a body or housing 271 having a first housing portion 270a attached to a second housing portion 270b by a fastener 272 (e.g., a screw, bolt, rivet, etc.). The housing 271 at least partially covers the frame 210, the latch 230, and the actuator 250. The frame 210 includes a web opening 226 at a proximal end portion 204 of the latch assembly 100. The web opening 226 is configured to receive the belt 112 extending from the passenger restraint 110 (FIG. 1). Although the web opening 226 is configured to receive the belt 112 in the illustrated embodiment, in other embodiments the web opening 226 can be configured to be attached to or otherwise operably coupled to other structures. For example, in certain embodiments the web opening 226 can be configured to be releasably attached directly to the passenger restraint 110 or to a rigid structure carried by the passenger restraint 110. In still further embodiments, the web opening 226 can be fixedly attached directly to the passenger restraint 110. In the illustrated embodiment, the frame also 210 includes a first jaw 212 at a distal end portion 206 of the latch assembly 100. As shown in FIG. 2A, the first jaw 212 is configured to cooperate with a second jaw 232 of the latch 230 to releasably engage the anchor 102.

Figure 2B:
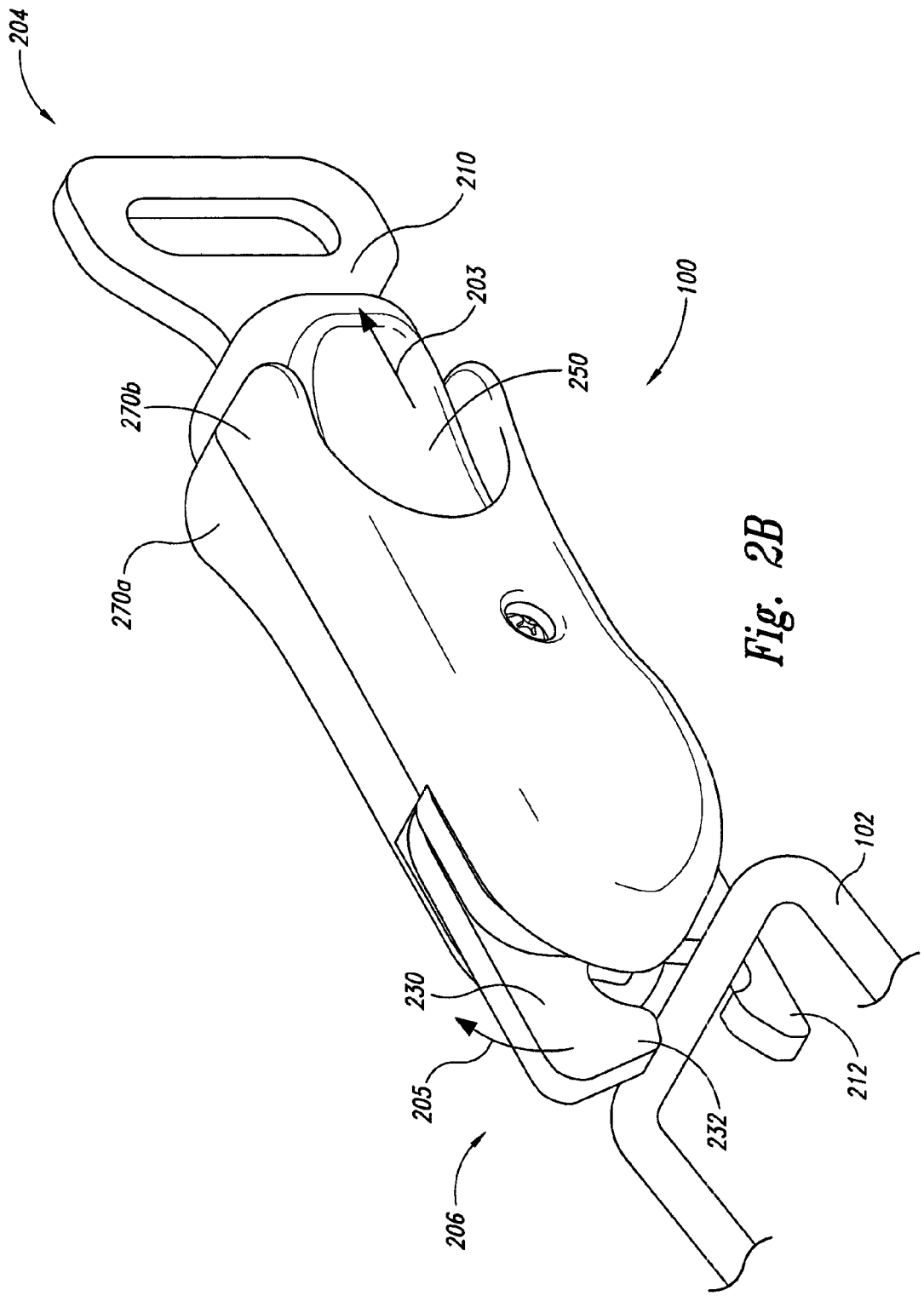
FIG. 2B is an isometric view of the latch assembly in an open position.

In FIG. 2B, the second jaw 2342 has moved to the open position to release the anchor 102. As described in greater detail below with reference to FIGS. 4A-4C, when the actuator 250 is moved toward the proximal end portion 204 of the latch assembly 100 in a direction indicated by arrow 203, the latch 230 pivots to move the second jaw 2342 away from the first jaw 212 in a direction indicated by arrow 205.

Figure 2C:
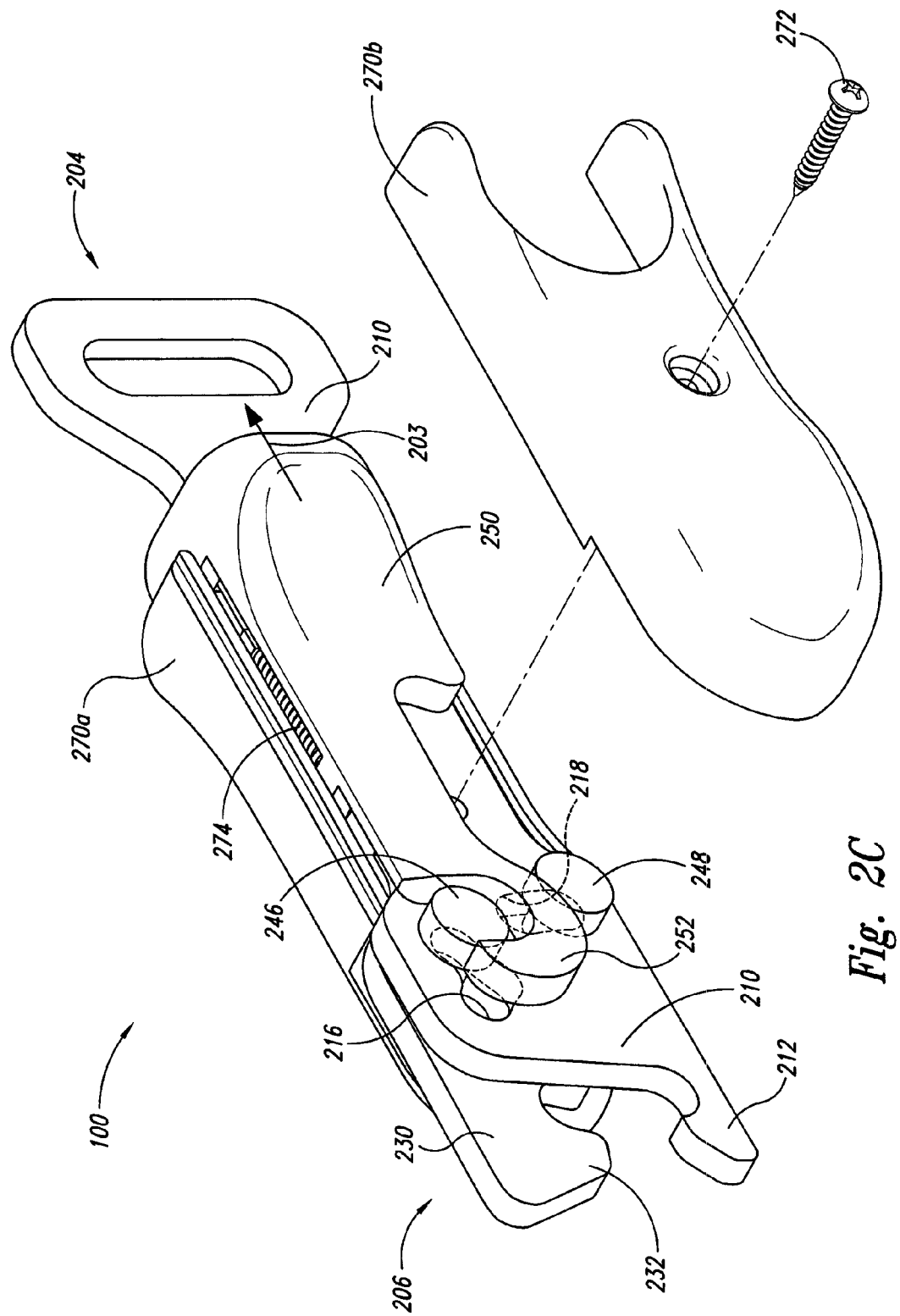
FIG. 2C is a partially exploded isometric view of the latch assembly of FIG. 2B.

FIG. 2C is a partially exploded isometric view of the latch assembly 100 of FIGS. 2A and 2B illustrating certain features of the latch assembly 100 in more detail. For example, a first guide pin or guide feature 246 projects from the latch 230 and is movably received in a corresponding first opening 216 in the frame 210. A second guide pin or guide feature 248 also projects from the latch 230 and is movably received in a corresponding second opening 218 in the frame 210. The actuator 250 includes a hook end portion 252 that engages the first guide feature 246 when the actuator 250 is moved toward the proximal end portion 204 of the latch assembly 100 in the direction indicated by arrow 203.

The latch assembly 100 also includes a biasing member 274 (e.g., a compression spring) operably coupled between the frame 210 and actuator 250. When the actuator 250 is moved toward the proximal end portion 204, the biasing member 274 is compressed thereby providing resistance to the movement of the actuator 250 in the direction of arrow 203. When the actuator 250 is released, the biasing member 274 urges the actuator 250 in a direction opposite to arrow 203 to move the second jaw 232 toward the closed position.

Figure 3D:
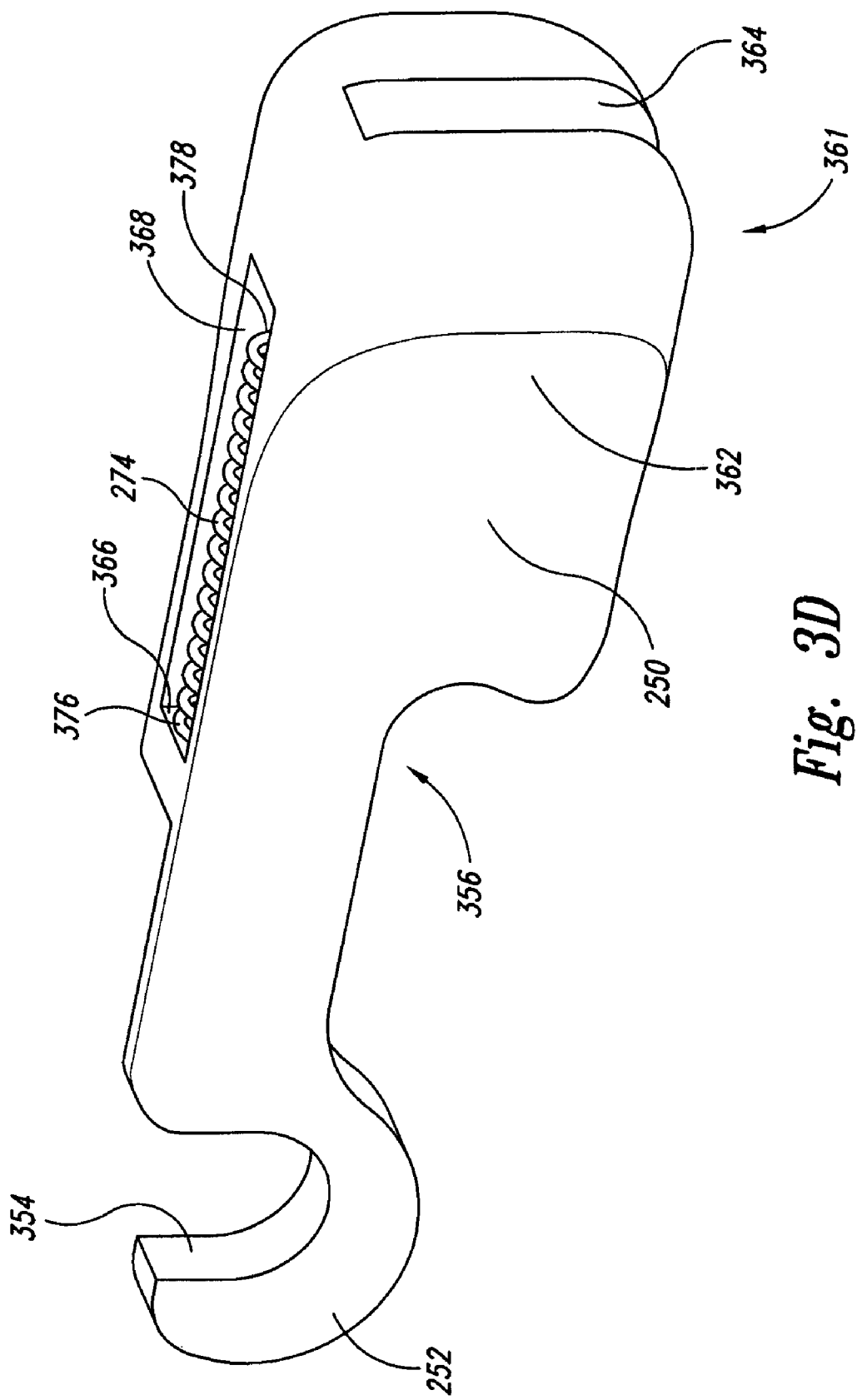
FIGS. 3D and 3E are isometric views, of various components of the latch assembly of FIGS. 2A-2C.
Figure 3E:
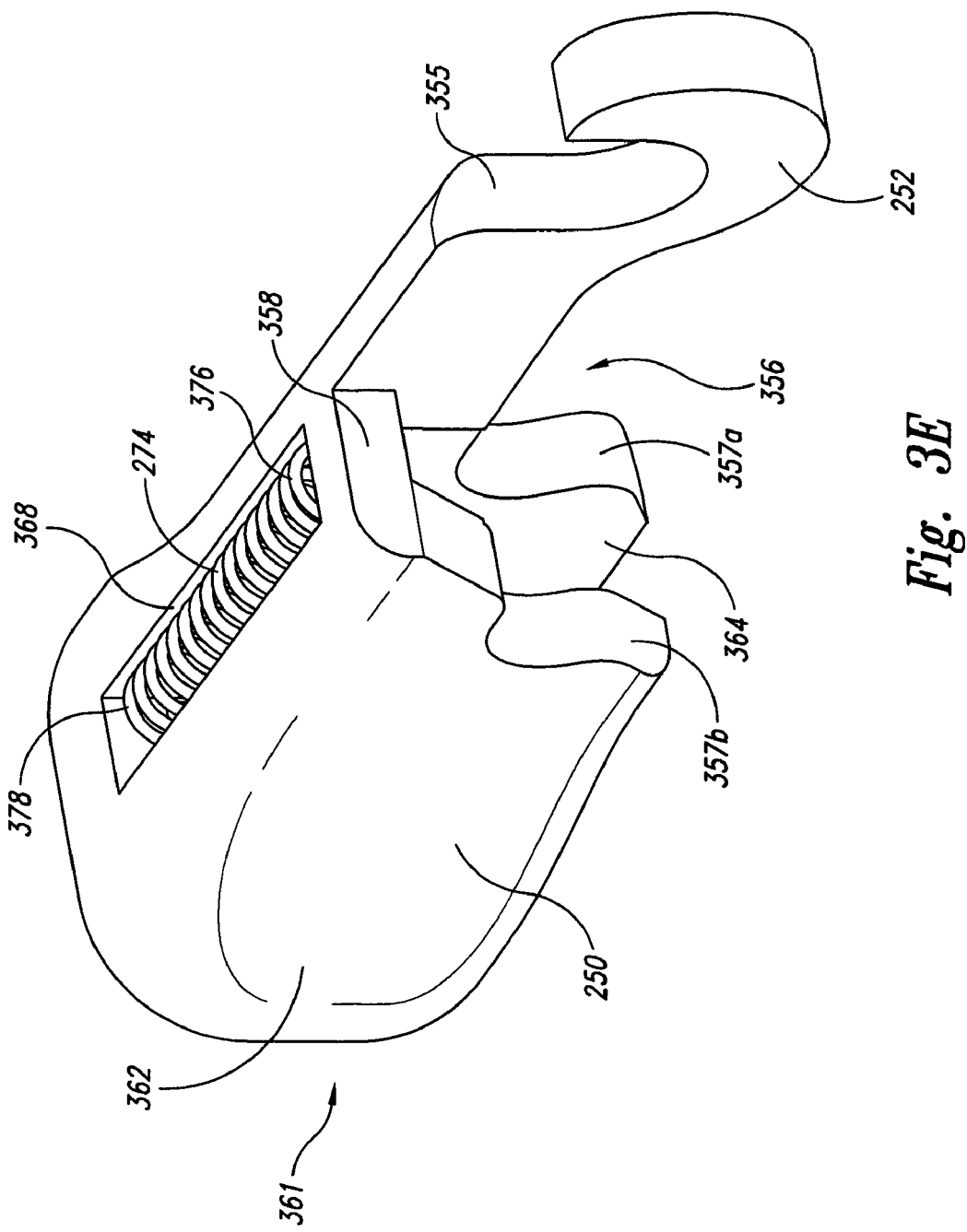

FIG. 3A is a side view of the frame 210, FIG. 3B is a side view of the latch 230, FIG. 3C is a rear view of the latch 230, and FIGS. 3D and 3E are isometric views of the actuator 250 of the latch assembly 100 illustrated in FIGS. 2A-2C. Referring first to FIG. 3A, the first jaw 212 includes a first inclined surface 313 and a first engagement surface 314. In the illustrated embodiment, the first engagement surface 314 has a generally hemispherical shape configured to receive an anchor having a corresponding cross sectional shape. In other embodiments, however, the first engagement surface 314 can have other shapes. For example, the first engagement surface 314 can have a rectilinear shape and/or include grooves or other features corresponding to the shape of the anchor and/or facilitating attachment thereto. In still further embodiments, the first engagement surface 314 can be generally flat and not include any retention features.

The first opening 216 and second opening 218 extend through a distal end portion 311 of the frame 210. In the illustrated embodiment, the first opening 216 is a slot having a generally "V" shape, and the second opening 218 is a slot having a generally linear shape. In other embodiments, however, the first opening 216 and second opening 218 can have different shapes to accommodate different motions of the first guide feature 246 and second guide feature 248, respectively.

The frame 210 also includes an aperture 323 that receives the fastener 272 illustrated in FIGS. 2A-2C that secures the first and second housing portions 270 to the latch assembly 100. The frame 210 also includes a first recess 322 and a stop 324 along an edge portion 321. The recess 322 receives the biasing member 274 (FIG. 2C) which presses against the stop 324 and urges the actuator 250 toward the distal end portion 311 of the frame 210. In the illustrated embodiment, the medial portion of the frame has a reduced height in relation to the distal end portion 311 and the proximal end portion 325. In other embodiments, however, the frame 210 can have other shapes and/or configurations.

FIG. 3B is a side view of the latch 230. In the illustrated embodiment, the second jaw 232 has a second inclined surface 333 to facilitate inserting the anchor 102 into the latch assembly 100 (FIGS. 2A-2C). For example, as the latch assembly 100 is pressed against the anchor 102, the anchor 102 contacts the first inclined surface 313 of the first jaw 212 and the second inclined surface 333 of the second jaw 232 and moves the second jaw 232 away from the first jaw 212 so that the anchor 102 can be received between the two jaws. The second jaw 232 also has a second engagement surface 334 configured to engage the anchor 102 with the first engagement surface 314 of the first jaw 212. In the illustrated embodiment, the second engagement surface 334 includes a generally hemispherical shape (similar to the first engagement surface 314 shown in FIG. 3A) corresponding to an anchor with a generally circular cross section. The latch assembly 230 further includes a first aperture 342 positioned to receive at least a portion of the first guide feature 346, and a second aperture 344 positioned to receive at least a portion of the second guide aperture 348.

FIG. 3C is a rear view of the latch 230 illustrating the first guide feature 246 and the second guide feature 248 projecting from the latch 230. In the illustrated embodiment, the first guide feature 246 and the second guide feature 248 each includes a shaft portion 247 and a head portion 249. Each shaft portion 247 is at least partially inserted into the latch 230. Each head portion 249 is spaced apart from the latch 230 and configured to retain the corresponding first guide feature 246 in the first opening 216 in the frame 210, and the second guide feature 248 in the second opening 248 in the frame 210. In certain embodiments, the first guide feature 246 and second guide feature 248 can include, for example, pins, posts, studs, and any other types of suitable guide features projecting from the latch 230. Moreover, in certain embodiments, the first guide feature 246 and the second guide feature 248 can be fixedly retained in the latch 230 (e.g., with a press-fit). In other embodiments, however, the first guide feature 246 and the second guide feature 248 can be rotatably retained in the latch 230 to allow them to spin with reference to the latch 230. Accordingly, the present disclosure is not limited to the particular types of guide features described above or shown in the Figures.

FIGS. 3D and 3E are isometric views of the actuator 250. Referring to FIGS. 3D and 3E together, in the illustrated embodiment the hook end portion 252 has a generally "U"-shaped configuration to engage the first guide feature 246 (FIG. 2C). More specifically, the hook end portion 252 includes a first abutment surface 354 and an opposing second abutment surface 355. The hook end portion 252 extends from one side of a medial portion 356 of the actuator 250 and has a reduced width with reference to the medial portion 356.

The medial portion 356 of the actuator 250 includes a cavity 368 configured to receive the biasing member 274. A first end portion 376 of the biasing member 274 presses against a corresponding contact surface 366 of the cavity 368. The cavity 368 intersects a channel 364 extending through the medial portion 356 as well as a proximal end portion 361 of the actuator 250. The medial portion 356 also includes a first cut-away portion 357a extending from the hook end portion 252, and a second cut-away portion 357b extending from a side surface 358 that is generally perpendicular to the hook end portion 252.

The width of the actuator 250 gradually increases from the medial portion 356 toward the proximal end portion 361 forming a raised grip surface 362. The grip surface 362 enables a user to manually slide or otherwise move the actuator 250 in the direction of the arrow 203 to facilitate operation of the latch assembly 100 (FIG. 2C). For example, a user can open the latch assembly 100 by pulling the actuator 250 in the direction of the arrow 203. One skilled in the art will appreciate that the actuator 250 can be any type of button, trigger, pull, etc. that can be actuated to open the latch assembly 100.

In the illustrated embodiment, the actuator 250 is configured to cooperate with the frame 210 and the latch 230 within the first and second housing portions 270. When the actuator 250 is positioned over the frame 210 as shown in, for example, FIG. 2C, the frame 210 can movably slide through the channel 364 of the actuator 250. Moreover, the stop 324 of the frame 210 can also movably slide through the cavity 368 of the actuator 250. The reduced width of the hook end portion 252 extending from the side surface 358 of the actuator 250 allows the first and second housing portions 270 to accommodate the actuator 250, the latch 230, and the frame 210. Moreover, the cut-away portions 357 allow the actuator 250 to slide within the first and second housing portions 270 without interfering with the fastener 272 holding the first and second housing portions 270 together.

Figure 4A:
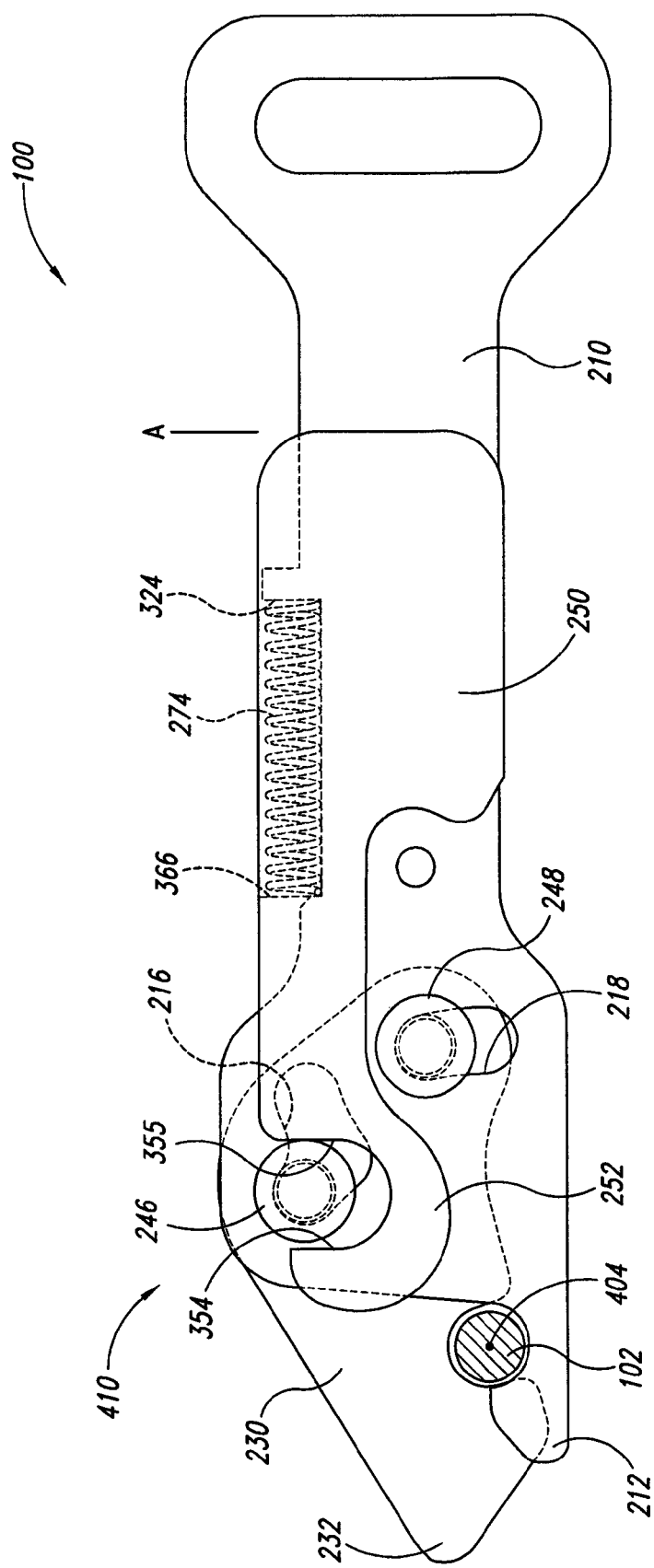
FIGS. 4A-4C are a series of side views illustrating various stages of operation of the latch assembly of FIGS. 2A-2C in accordance with an embodiment of the disclosure.
Figure 4B:
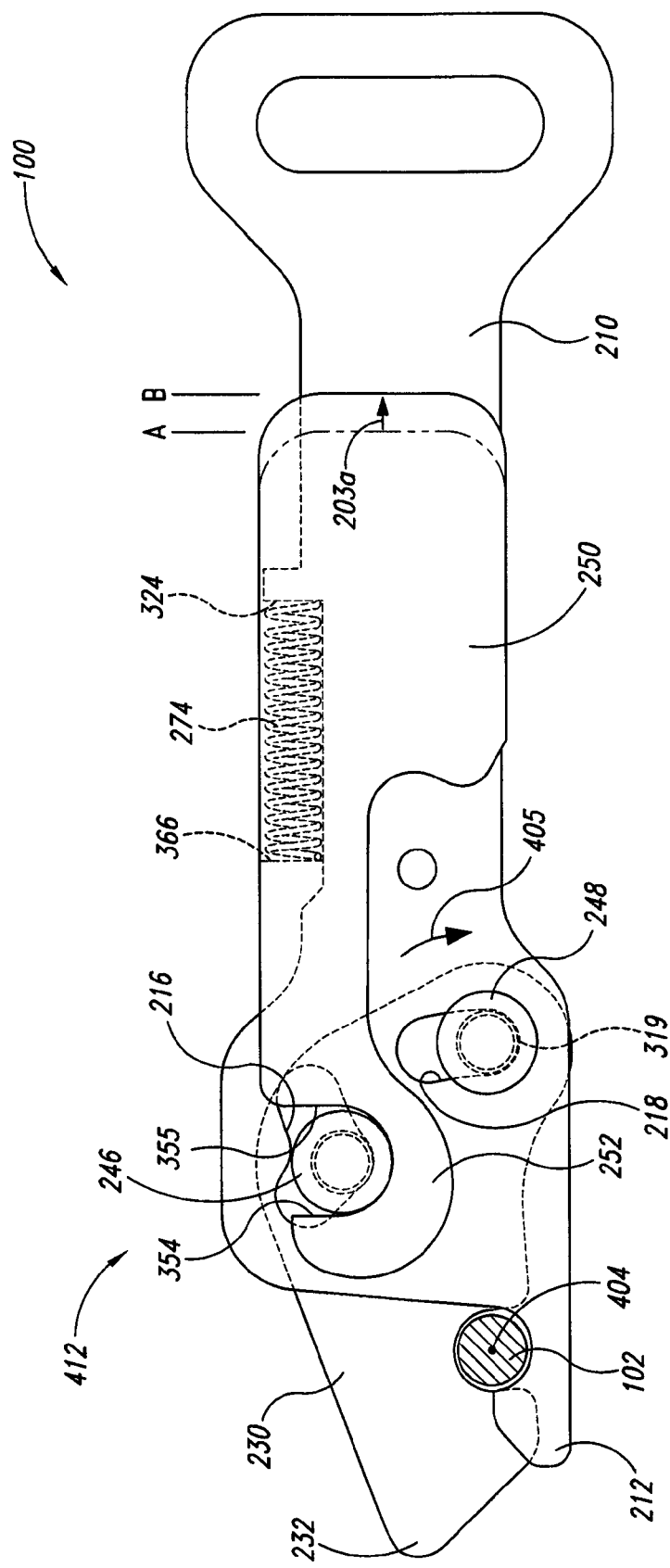
Figure 4C:
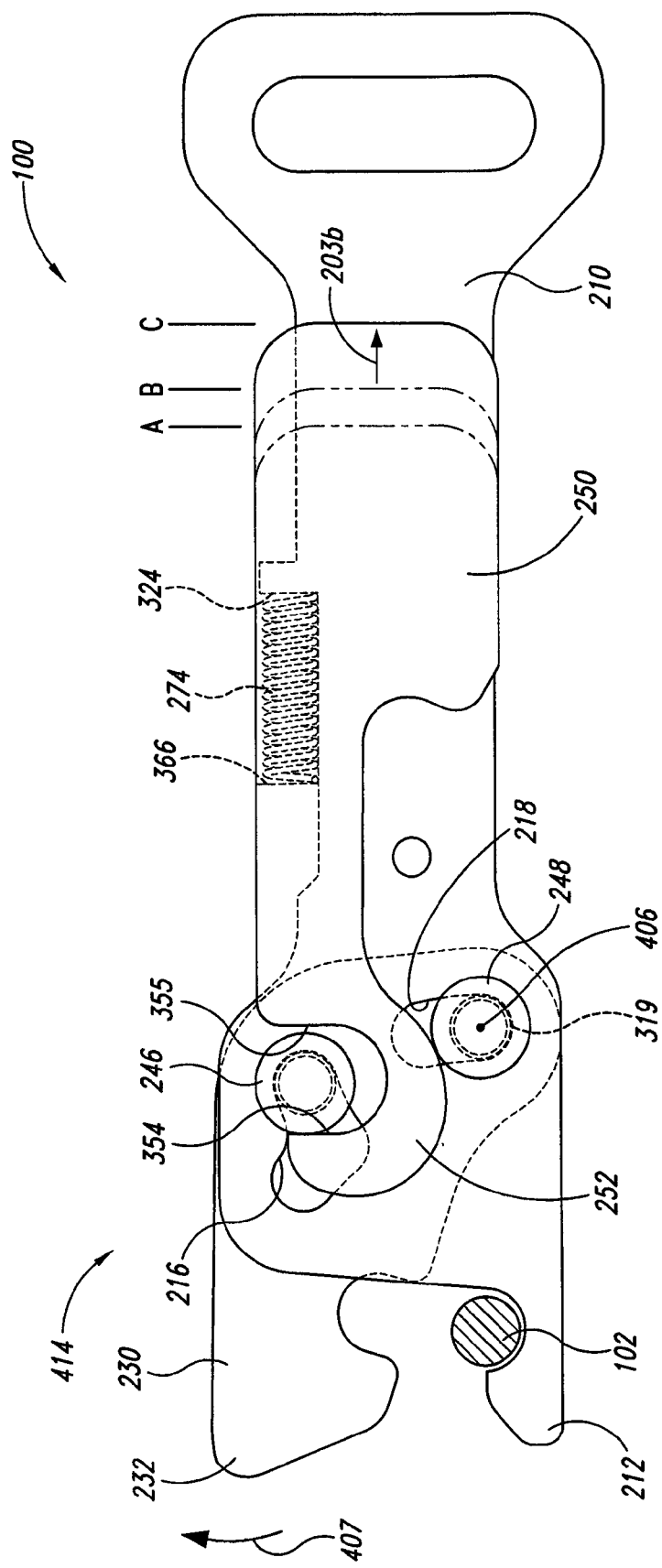

FIGS. 4A-4C are a series of side views illustrating the latch assembly 100 in various stages of opening. In the embodiment illustrated in FIGS. 4A-4C, the latch 230 rotates with reference to the frame 210 about two different pivot points. Referring first to FIG. 4A, when the latch assembly 100 is closed, the actuator 250 biases the latch 230 toward a first position 410 in which the first jaw 212 and the second jaw 232 capture and retain the anchor 102. More specifically, the biasing member 274 pushes against the contact surface 366 of the actuator 250 to urge the actuator 250 toward the latch 230. This causes the second abutment surface 355 of the actuator 250 to drive the first guide feature 246 toward an upper left portion of the "V"-shaped first opening 216 in the frame 210. When the first guide feature 246 is in this location, the second guide feature 248 is positioned toward an upper portion of the second opening 218 in the frame 210. With the latch 230 in this position, the actuator 250 is at position A in which latch assembly 100 retains the anchor 102 between the frame 210 and latch 230 until a user operates the actuator 250 to release the anchor 102.

In FIG. 4B, the latch assembly 100 is still closed (e.g., the anchor is retained between the first jaw 212 and second jaw 232), but the operator (not shown) has moved the actuator 250 from position A to position B causing the latch 230 to rotate about a first pivot point 404 at the anchor 102. As the actuator 250 moves in the direction of arrow 203a to the intermediate position B, the latch 230 rotates in the direction of an arrow 405 from the first position 410 shown in FIG. 4A to the second position 412 shown in FIG. 4B. As the latch 230 rotates toward the second position 412, the first guide feature 246 slides along the first abutment surface 354, and the latch 230 pivots about the first pivot point 404. In the illustrated embodiment, the first pivot point 404 is at least proximate to the anchor 102. As the latch 230 rotates about the first pivot point 404, the first guide feature 246 moves through the first opening, and the second guide feature 248 moves through the second openings 218 until the second guide feature 248 contacts the pivot surface 319 of the second opening 218. Although the latch 230 has rotated into the second position 412, the latch assembly 100 still retains the anchor 102 between the frame 210 and latch 230.

In FIG. 4C, the operator has moved the actuator 250 to position C to rotate the latch 230 to a third position 414 and open the latch assembly 100. In the third position 414, the second jaw 232 is rotated in the direction indicated by arrow 407 to be spaced apart from the first jaw 212. To rotate the latch 230 into the third position 414, the actuator 250 continues to move in the direction of arrow 203b from the intermediate position B to an unlocked position C. During this movement, the first abutment surface 354 continues to contact the first guide feature 246 and drives it toward an upper right portion of the "V"-shaped first opening 216. As the latch 230 pivots to the third position 414, however, the second guide feature 248 does not slide through the second opening 218. Instead, the second guide feature 248 remains at the pivot surface 319 of the second opening 218 and the latch 230 pivots about the second guide feature 248. In the illustrated embodiment, the second guide feature 248 represents a second pivot point 406. Accordingly, as the latch 230 rotates about the second pivot point 406, the first guide feature 246 moves through the first opening 216.

The embodiments of the latch assembly 100 described above provide several advantages over conventional latch assemblies. One advantage, for example, is that the latch 230 has to move through two different motions to release the anchor 102 from the latch assembly 100. For example, when a user operates the actuator 250, the latch 230 rotates from the first position 410 to the second position 412 about the first pivot point 404. During this first movement, however, the anchor 102 remains engaged between the first jaw 212 and the second jaw 232. To release the anchor 102, the latch 230 must be rotated again from the second position 412 to the third position 414 about the second pivot point 406. Rotating the latch 230 about multiple pivot points accordingly provides an increased number of movements to release the anchor 102 from the latch assembly 100. Pivoting the latch 230 about the multiple pivot points also helps to at least partially prevent an unintentional release of the anchor 102, as the second jaw 232 remains engaged with the anchor 102 when the latch 230 is in the first position and the second position 412.

From the foregoing, it will be appreciated that specific embodiments of the disclosure have been described herein for purposes of illustration, but that various modifications may be made without deviating from the spirit and scope of the various embodiments of the disclosure. For example, the latch assemblies can include a different number of pivot points or pivot points in different locations. Moreover, the latch assemblies can also be coupled to different portable passenger restraints, including, for example, forward facing child car seats. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:
1. A latch assembly for releasably engaging an anchor in a vehicle, the latch assembly comprising:
a frame including a first engagement surface;
a latch movably coupled to the frame, the latch including a second engagement surface configured to cooperate with the first engagement surface to releasably engage the anchor in a space therebetween, wherein the latch is rotatable from a first latch position to a second latch position about a first pivot point located in the space between the first and second engagement surfaces, and wherein the latch is further rotatable from the second latch position to a third latch position about a second pivot point different from the first pivot point; and
an actuator movably coupled to the frame, wherein movement of the actuator from a first actuator position toward a second actuator position rotates the latch from the first latch position to the second latch position about the first pivot point, and from the second latch position to the third latch position about the second pivot point.
2. The latch assembly of claim 1:
wherein the frame includes a first opening and a second opening; and
wherein the latch includes a first guide feature and a second guide feature, wherein the first guide feature is movably received in the first opening of the frame, and wherein the second guide feature is movably received in the second opening of the frame.
3. The latch assembly of claim 2 wherein the first opening has a generally "V" shape and the second opening has a generally linear shape.
4. The latch assembly of claim 1:
wherein the frame includes a first opening and a second opening, wherein the first opening has a generally "V" shape and the second opening has a generally linear shape; and
wherein the latch includes a first guide pin and a second guide pin fixedly attached to the latch, wherein the first guide pin moves through the first opening and the second guide pin moves through the second opening during movement of the actuator.
5. The latch assembly of claim 1 wherein the frame includes a first jaw and the latch includes a second jaw, and wherein the anchor is retained between the first and second jaws when the latch is in the first latch position.
6. The latch assembly of claim 5 wherein the anchor is retained between the first and second jaws when the latch is in the second latch position, and wherein the second jaw is spaced apart from the first jaw to release the anchor when the latch is in the third latch position.
7. The latch assembly of claim 1 wherein the latch includes at least one guide feature projecting therefrom, and wherein the second pivot point is positioned at least proximate to the guide feature.
8. The latch assembly of claim 1:
wherein the latch includes a guide feature projecting therefrom; and
wherein the actuator includes an end portion having an abutment surface that cooperates with the guide feature during movement of the actuator.
9. A latch assembly for releasably engaging an anchor in a vehicle, the latch assembly comprising:
a frame;

a latch movably coupled to the frame, wherein the latch is rotatable from a first latch position to a second latch position about a first pivot point, and wherein the latch is further rotatable from the second latch position to a third latch position about a second pivot point different from the first pivot point; and
an actuator movably coupled to the frame, wherein the actuator includes:
a proximal end portion having a channel extending therethrough;
a medial portion extending from the proximal end portion, wherein the medial end portion has a biasing member cavity extending therethrough and intersecting the channel; and
a distal end portion extending from the medial portion, wherein the distal end portion has a generally hook shape, and wherein movement of the actuator from a first actuator position toward a second actuator position rotates the latch from the first latch position to the second latch position about the first pivot point, and from the second latch position to the third latch position about the second pivot point.
10. A latch assembly for releasably engaging an anchor in a vehicle, the latch assembly comprising:
a frame having a first opening and a second opening;
a latch having a jaw portion that receives the anchor, wherein the latch further includes a first guide feature movably received in the first opening of the frame and a second guide feature moveably received in the second opening of the frame; and
an actuator movable relative to the frame, wherein movement of the actuator from a locked position toward an intermediate position pivots the latch about a pivot point positioned within a cross section of the anchor, and wherein continued movement of the actuator from the intermediate position toward an unlocked position pivots the latch about the second guide feature and releases the anchor from the jaw portion of the latch.
11. The latch assembly of claim 10 wherein the first opening is a first slot having a generally "V" shape, and wherein the second opening is a second slot having a generally linear shape.
12. The latch assembly of claim 11 wherein the second opening has a pivot surface, and wherein the second guide feature contacts the pivot surface when the latch pivots about the second guide feature.
13. The latch assembly of claim 10 wherein the first guide feature moves in a first direction in the first opening and the second guide feature moves in a second direction in the second opening when the latch pivots about the anchor, and wherein the first guide feature moves in a third direction in the first opening when the latch pivots about the second guide feature.
14. The latch assembly of claim 10:
wherein the first opening has a generally "V" shape and the second opening has a generally linear shape;
wherein the first guide feature is a first pin fixedly attached to the latch, wherein the first pin cooperates with an abutment surface of the actuator; and
wherein the second guide feature is a second pin fixedly attached to the latch, wherein the second pin contacts a pivot surface of the frame during at least a portion of movement of the actuator.
15. A latch assembly for releasably engaging an anchor in a vehicle, the latch assembly comprising:
a frame having a first opening and a second opening;

a latch having a jaw portion that receives the anchor, wherein the latch further includes a first guide feature movably received in the first opening of the frame and a second guide feature moveably received in the second opening of the frame; and an actuator movable relative to the frame, wherein movement of the actuator from a locked position toward an intermediate position pivots the latch about the anchor, and wherein continued movement of the actuator from the intermediate position toward an unlocked position pivots the latch about the second guide feature and releases the anchor from the jaw portion of the latch, wherein the frame includes a stop member and the actuator includes a cavity, and wherein the latch assembly further comprises a biasing member positioned in the cavity of the actuator, wherein the biasing member urges the actuator away from the stop member toward the locked position.

16. A latch assembly for releasably engaging an anchor in a vehicle, the latch assembly comprising:

a frame having a first opening and a second opening;

a latch having a jaw portion that receives the anchor, wherein the latch further includes a first guide feature movably received in the first opening of the frame and a second guide feature moveably received in the second opening of the frame; and an actuator movable relative to the frame, wherein movement of the actuator from a locked position toward an intermediate position pivots the latch about the anchor, and wherein continued movement of the actuator from the intermediate position toward an unlocked position pivots the latch about the second guide feature and releases the anchor from the law portion of the latch, wherein the actuator includes a channel extending longitudinally through a proximal end portion of the actuator, and wherein the frame is at least partially received within the channel.

17. A latch system for releasably engaging an anchor in a vehicle, the latch system comprising:

a frame having an end portion for coupling to a web;

a latch movably coupled to the frame;

first means for pivoting the latch relative to the frame and about a first pivot point positioned within a cross section of the anchor; and second means for pivoting the latch relative to the frame and about a second pivot point, different from the first pivot point, to release the latch from the anchor.

18. The latch system of claim 17 wherein the first means includes a guide feature projecting from the latch that cooperates with an abutment surface of an actuator.

19. The latch system of claim 17 wherein the second means includes a guide feature projecting from the latch that cooperates with a pivot surface of the frame.

20. The latch assembly of claim 17:

wherein the first means includes a first guide feature projecting from the latch and movably received in a first opening in the frame;

wherein the second means includes a second guide feature projecting from the latch and movably received in a second opening in the frame; and wherein the first pivot point is positioned at least proximate to the anchor and the second pivot point is position at least proximate to the second guide feature.

* * * * *

UNITED STATES PATENT AND TRADEMARK OFFICE
CERTIFICATE OF CORRECTION

| | | |
|---|---|---|
| PATENT NO. | : 7,918,001 B2 | Page 1 of 1 |
| APPLICATION NO. | : 12/060095 | |
| DATED | : April 5, 2011 | |
| INVENTOR(S) | : Fred Buckingham | |

It is certified that error appears in the above-identified patent and that said Letters Patent is hereby corrected as shown below:

Title Page; item (56);
On Page 2, in column 2, line 7, under "Other Publications", delete "Holmberqs," and insert
-- Holmbergs, --, therefor.

Signed and Sealed this
Twenty-first Day of June, 2011

David J. Kappos
*Director of the United States Patent and Trademark Office*